United States Patent
Ben-Rubi

(10) Patent No.: US 11,531,499 B2
(45) Date of Patent: Dec. 20, 2022

(54) DATA STORAGE THAT CONTROLS DECODE PERFORMANCE BY CHANGING PROGRAM PLC

(71) Applicant: Western Digital Technologies, Inc., San Jose, CA (US)

(72) Inventor: Refael Ben-Rubi, Rosh Haayin (IL)

(73) Assignee: Western Digital Technologies, Inc., San Jose, CA (US)

( * ) Notice: Subject to any disclaimer, the term of this patent is extended or adjusted under 35 U.S.C. 154(b) by 8 days.

(21) Appl. No.: 17/192,142

(22) Filed: Mar. 4, 2021

(65) Prior Publication Data

US 2022/0283737 A1    Sep. 8, 2022

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC .... G06F 3/0659; G06F 3/0611; G06F 3/0619; G06F 3/0673
See application file for complete search history.

(56) References Cited

U.S. PATENT DOCUMENTS

| | | | |
|---|---|---|---|
| 9,135,192 B2 | 9/2015 | Lin et al. | |
| 9,652,156 B2 * | 5/2017 | Alcantara | G06F 3/061 |
| 9,761,326 B2 | 9/2017 | Nakanishi et al. | |
| 9,792,995 B1 | 10/2017 | Shah et al. | |
| 9,799,405 B1 * | 10/2017 | Micheloni | G11C 16/28 |
| 10,002,086 B1 * | 6/2018 | Achtenberg | G06F 13/4068 |
| 10,284,233 B2 | 5/2019 | Bazarsky et al. | |
| 2012/0320672 A1 | 12/2012 | Meir et al. | |
| 2015/0242268 A1 * | 8/2015 | Wu | G11C 11/5642 714/773 |
| 2017/0031755 A1 * | 2/2017 | Nakanishi | G11C 29/028 |
| 2020/0192735 A1 | 6/2020 | Ioannou et al. | |

OTHER PUBLICATIONS

Wu, Guanying, Performance and Reliability Study and Exploration of NAND Flash-based Solid State Drives: A dissertation submitted in partial fulfillment of the requirements for the degree of Doctor of Philosophy at Virginia Commonwealth University, VCU, Richmond, Virginia, Aug. 2013, 120 pp.

Wu, et al., Exploiting Workload Dynamics to Improve SSD Read Latency via Differentiated Error Correction Codes, ACM Transactions on Design Automation of Electronic Systems, vol. 18, No. 4, Article 55, Pub. date: Oct. 2013, 22 pp.

\* cited by examiner

*Primary Examiner* — Baboucarr Faal
(74) *Attorney, Agent, or Firm* — Patterson & Sheridan, LLP; Steven H. VerSteeg

(57) ABSTRACT

A data storage device includes a memory device and a controller coupled to the memory device. When a program operation occurs, the controller is configured to determine a decode time for the data prior to programming the data to the memory device. The decode time determined by decoding the encoded data. A number of program loop cycles is determined using the decode time. The data is programmed to the memory device with the number of program loop cycles determined.

20 Claims, 2 Drawing Sheets

DATA STORAGE THAT CONTROLS DECODE PERFORMANCE BY CHANGING PROGRAM PLC

BACKGROUND OF THE DISCLOSURE

Field of the Disclosure

Embodiments of the present disclosure generally relate to data storage devices, such as solid state drives (SSDs), and program operations.

Description of the Related Art

Data storage devices may be capable of performing write, read, and erase operations to the internal memory devices of the data storage device. The internal memory devices may be flash memory, such as NAND or NOR memory. When a host device sends a write command to the data storage device, the data of the write command is programmed to a relevant internal memory device, such as a non-volatile memory (NVM). The internal memory device comprises a plurality of dies, each die comprising a first plane and a second plane, each plane comprising a plurality of blocks, and each block comprising a plurality of pages. Data storage operations on the internal memory device may operate at a block level, such that a garbage collection operation is executed on an entire block.

The write command is programmed with a number of program loop cycles (PLCs), where increasing the number of PLCs may decrease the bit error rate (BER) of the programmed data. However, the increased number of PLCs may increase the total programming time. Alternatively, decreasing the number of PLCs may decrease the total programming time, but increase the BER of the programmed data. The effects of the change in PLCs may be noticed during a read operation, such as when the programmed data is decoded. A higher BER may lead to a longer decode time and vice-versa.

Thus, there is a need in the art for an improved method of determining the number of program loop cycles of a program operation.

SUMMARY OF THE DISCLOSURE

The present disclosure generally relates to data storage devices, such as solid state drives (SSDs), and program operations. A data storage device includes a memory device and a controller coupled to the memory device. When a program operation occurs, the controller is configured to determine a decode time for the data prior to programming the data to the memory device. The decode time determined by decoding the encoded data. A number of program loop cycles is determined using the decode time. The data is programmed to the memory device with the number of program loop cycles determined.

In one embodiment, a data storage device includes a memory device and a controller coupled to the memory device. The controller is configured to determine a decoding time for data and a number of program loop cycles (PLCs) to program the data to the memory device, compare the decoding time to a threshold decoding time, determine that the decoded time is above or below the threshold decoding time, change the number of PLCs by one, and program the data to the memory device using the changed number of PLCs.

In another embodiment, a data storage device includes a memory device and a controller coupled to the memory device. The controller is configured to calculate a decode time for data to be written to the memory device, determine a number of program loop cycles (PLCs) to program the data to the memory device corresponding to the calculated decode time, program the data to the memory device using the number of PLCs plus one additional PLC, and decode the data during a read operation, wherein the decoding occurs for a first period of time, and wherein the first period of time is less than the calculated decode time for the programmed data using the number of PLCs plus one additional PLC.

In another embodiment, a data storage device includes memory means and means to adjust a number of program loop cycles (PLCs) based upon a decoding time for data to be programmed to the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and program operations. A data storage device includes a memory device and a controller coupled to the memory device. When a program operation occurs, the controller is configured to determine a decode time for the data prior to programming the data to the memory device. The decode time determined by decoding the encoded data. A number of program loop cycles is determined using the decode time. The data is programmed to the memory device with the number of program loop cycles determined.

Figure 1:
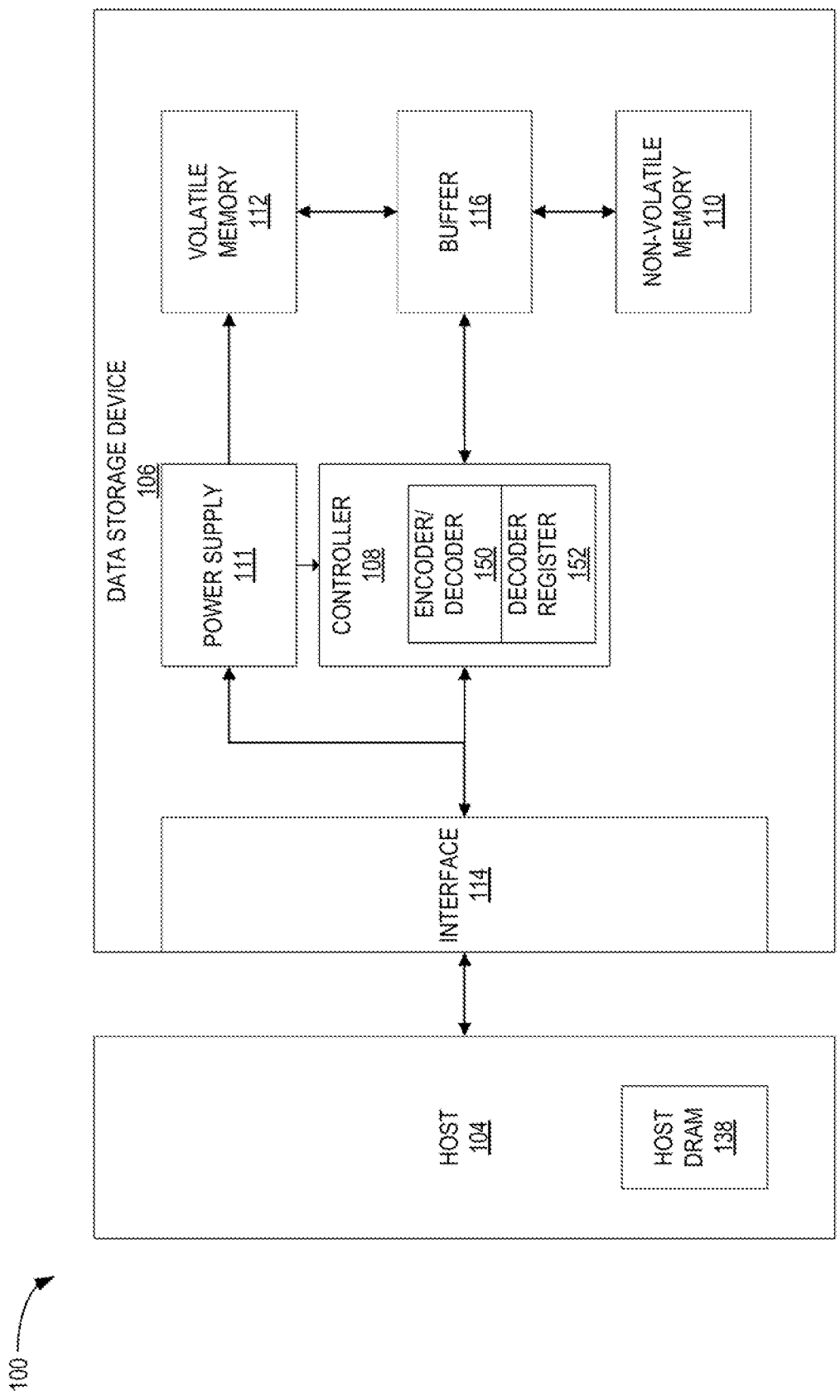
FIG. 1 depicts a schematic block diagram illustrating a storage system in which data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes an encoder/decoder module 150 and a decoder register 152. In some embodiments, the encoder/decoder module 150 may be separate components, such that the controller 108 includes an encoder module and a decoder module. When the controller 108 receives data associated with a write command from the host device 104, the data is encoded by the encoder/decoder module 150 prior to being programmed to the respective location in the NVM 110. Likewise, when a read command is received from the host device 104, the respective data is retrieved from the NVM 110. The read operation may include a sensing operation, a transferring operation, and a decoding operation, where the previously listed operations are performed sequentially. The transferring operation may refer to transferring data from the NVM 110 to the controller 108. Prior to transferring the data to the host device 104, the retrieved data is decoded by the encoder/decoder module 150. The decoder register 152 may track the data to be decoded as well as track a time to decode the retrieved data from the NVM 110.

Figure 2:
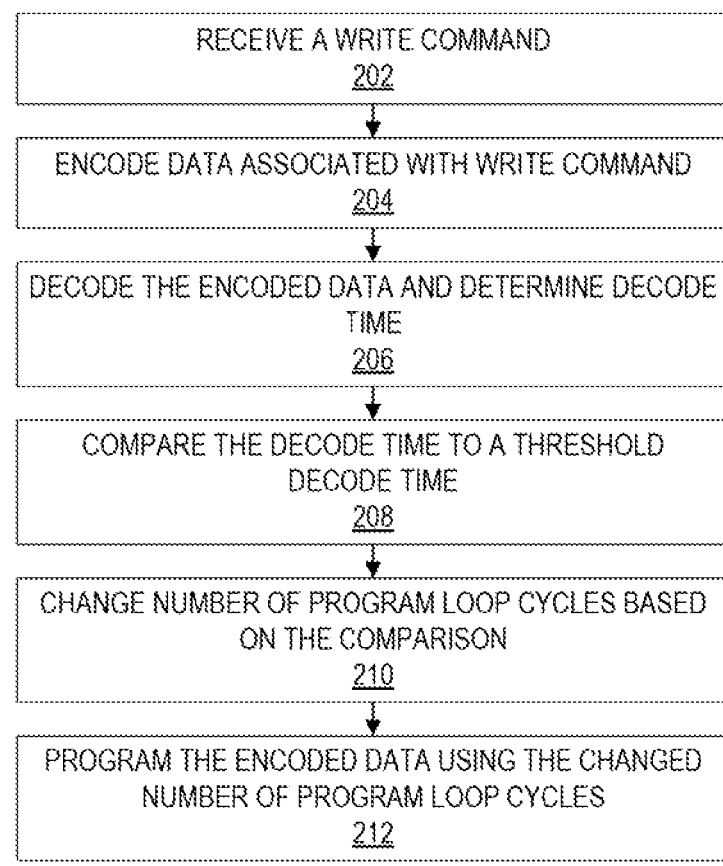
FIG. 2 depicts a flowchart illustrating a method of determining a number of program loop cycles for a program operation and programming data based on the determined number of program loop cycles, according to certain embodiments.

FIG. 2 depicts a flowchart illustrating a method 200 of determining a number of program loop cycles for a program operation and programming data based on the determined number of program loop cycles, according to certain embodiments. Aspects of the storage system 100 may be utilized in the description of the method 200 for exemplary purposes. For example, references to a controller may be made towards the controller 108.

At block 202, the controller 108 receives a write command from the host device 104. The write command is generated by the host device 104 and placed in a submission queue. The submission queue may be part of the host DRAM 138. The write command may be fetched from the submission queue of the host DRAM 138. In some examples, the queue depth is equal to about 1.

At block 204, the program operation for the write command is initiated. Although certain elements of the program operation are described, there may be other elements not described but are still contemplated, such as exclusive or (XOR) parity data generation. At block 204, the data of the received write command is encoded by the encoder/decoder module 150.

At block 206, the encoded data is decoded by the encoder/decoder module 150. After decoding the encoded data, a time to decode (i.e., decode time) is determined for the decode operation. The decode time may be determined by the decoder register 152. At block 208, the decode time is compared to a threshold decode time. The threshold decode time may be a set of threshold decode times stored in a volatile memory, such as the volatile memory 112, in a controller memory, such as a DRAM internal to the controller, in a controller memory buffer (CMB), or in a host memory buffer (HMB). In one example, the threshold decode times are stored in a table, such as Table 1 below. The values listed are not intended to be limiting, but to provide an example of a possible embodiment.

TABLE 1

| Decode Time After Encode (nsec) | Number of PLCs in SLC Program | Number of PLCs in TLC Program |
|---|---|---|
| 1000 | 1 | 5 |
| 1200 | 1 | 6 |
| 1400 | 1 | 7 |
| 1600 | 1 | 8 |
| 1800 | 2 | 9 |
| 2000 | 2 | 10 |
| 2500 | 2 | 11 |
| >3000 | 3 | 12 |

A number of program loop cycles (PLCs) are associated with each of the decode time thresholds (i.e., 1000 nsec, 1200 nsec, 1400 nsec, etc.) shown. A PLC includes a program pulse and verification operation. The program pulse transmits a voltage across a floating gate transistor of the wordline and the verification operation verifies whether the correct voltage has been stored in the floating gate transistor. With each additional PLC, the voltage stored in the floating gate transistor is more precise and thus, the data stored in that memory location may be more accurate.

Furthermore, for each memory type, such as SLC, MLC, TLC, QLC, and the like, the numbers of PLCs may be different. The more memory dense a memory type is, where SLC memory is less than MLC memory, MLC memory is less dense than TLC memory, and so-forth, the greater the number of PLCs are necessary for a program operation. For example, as shown in Table 1, the number of PLCs for a SLC program with decode time of 1600 nsec is 1, whereas for the same decode time of 1600 nsec, a TLC program utilizes 8 PLCs. Because a longer decode time may signify a presence of errors, the number of PLCs for the program operation is increased to decrease the amount of errors programmed to the memory cell.

When the decode time is compared to a threshold decode time, such as those shown in Table 1, the controller 108 may be configured to determine whether the decode time is above or below the threshold decode time. For example, when the decode time is 1700 nsec, the controller 108 determines that the decode time is above the threshold decode time of 1600 nsec, but below the threshold decode time of 1800 nsec. At block 210, the number of PLCs is changed based on the comparison of the decode time to the threshold decode times.

In one example, regarding a SLC program, data having a decode time of about 1700 nsec may originally be programmed in 1 PLC. However, because of the decode time, the controller 108 may determine that an additional PLC is necessary, thus increasing the number of PLCs from 1 to 2. Likewise, data having a decode time of 1700 may originally be programmed in 2 PLCs. However, because of the decode time, the controller 108 may determine that less PLCs may be adequate to appropriately program the data to the memory location. Therefore, the number of PLCs may be decreased from 2 to 1.

In another example, regarding a TLC program, data having a decode time of about 1700 nsec may originally be programmed in 8 PLCs. However, because of the decode time, the controller 108 may determine that an additional PLC is necessary, thus increasing the number of PLCs from 8 to 9. Likewise, data having a decode time of 1700 may originally be programmed in 9 PLCs. However, because of the decode time, the controller 108 may determine that less PLCs may be adequate to appropriately program the data to the memory location. Therefore, the number of PLCs may be decreased from 9 to 8.

By increasing the number of PLCs, a longer program operation may occur, where the longer program operation may result in a more accurate program. However, when decoding the data during a read operation, the decode operation time may be a time that is expected or reasonable due to the more accurate program during the program operation. In another example, because the number of PLCs was increased during the program operation, the decode operation time during the read operation may be decreased. Likewise, by decreasing the number of PLCs, a shorter program operation may occur. At block 212, controller 108 is configured to program the encoded data using the changed number of PLCs determined at block 210 to the respective location in the NVM 110.

By determining a number of program loop cycles by a decode time during a program operation, the read performance may be controllable and known.

In one embodiment, a data storage device includes a memory device and a controller coupled to the memory device. The controller is configured to determine a decoding time for data and a number of program loop cycles (PLCs) to program the data to the memory device, compare the decoding time to a threshold decoding time, determine that the decoded time is above or below the threshold decoding time, change the number of PLCs by one, and program the data to the memory device using the changed number of PLCs.

The determining includes determining that the decoded time is above the threshold. The changing the number of PLCs includes increasing the number of PLCs. The determining includes determining that the decoded time is below the threshold. The changing the number of PLCs comprises decreasing the number of PLCs. The controller is further configured to encode the data and decode the data prior to determining the decoding time. The controller is further configured to read from a decoder register the decoding time. The controller includes a table tracking the decode time threshold relative to the number of PLCs. The number of PLCs is greater for triple level cells (TLCs) compared to single level cells (SLCs). The comparing includes comparing the decoding time to a value found in the table. The controller is configured to perform a read operation with a queue depth of 1. The read operation includes decoding the data. The decoding the data occurs for a time period that is less than the decoded time when the changing includes increasing the number of PLCs. An amount of time to decode data at a read operation after the data is programmed is decreased with an increase in the number of PLCs. The controller is configured to calculate a number of PLCs to program the data. An amount of time to program the data for the calculated number of PLCs is a first period of time. An amount of time to program data is decreased when the decoded time is below the threshold from the first period of time.

In another embodiment, a data storage device includes a memory device and a controller coupled to the memory device. The controller is configured to calculate a decode time for data to be written to the memory device, determine a number of program loop cycles (PLCs) to program the data to the memory device corresponding to the calculated decode time, program the data to the memory device using the number of PLCs plus one additional PLC, and decode the data during a read operation, wherein the decoding occurs for a first period of time, and wherein the first period of time is less than the calculated decode time for the programmed data using the number of PLCs plus one additional PLC.

The programming occurs to a triple level cell (TLC) of the memory device. The read operation includes sensing, transferring, and decoding performed sequentially. The controller maintains a table that matches the decode time to the number of PLCs. The number of PLCs for the decode time is different for a single level cell (SLC) and a triple level cell (TLC). The controller is configured to search the table and retrieve the number of PLCs based upon the decode time.

In another embodiment, a data storage device includes memory means and means to adjust a number of program loop cycles (PLCs) based upon a decoding time for data to be programmed to the memory means.

The data storage device further includes means to compare the decoding time for data to be programmed to a threshold value. The data storage device further includes means to decode the data.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to: determine a decoding time for data and a number of program loop cycles (PLCs) to program the data to the memory device;
compare the decoding time to a threshold decoding time;
determine that the decoded time is above or below the threshold decoding time;
change the number of PLCs by one; and program the data to the memory device using the changed number of PLCs.

2. The data storage device of claim 1, wherein the determining comprises determining that the decoded time is above the threshold, and wherein changing the number of PLCs comprises increasing the number of PLCs.

3. The data storage device of claim 1, wherein the determining comprises determining that the decoded time is below the threshold, and wherein changing the number of PLCs comprises decreasing the number of PLCs.

4. The data storage device of claim 1, wherein the controller is further configured to encode the data and decode the data prior to determining the decoding time.

5. The data storage device of claim 1, wherein the controller is further configured to read from a decoder register the decoding time.

6. The data storage device of claim 1, wherein the controller comprises a table tracking the decode time threshold relative to the number of PLCs.

7. The data storage device of claim 6, wherein the number of PLCs is greater for triple level cells (TLCs) compared to single level cells (SLCs).

8. The data storage device of claim 6, wherein the comparing comprises comparing the decoding time to a value found in the table.

9. The data storage device of claim 1, wherein the controller is configured to perform a read operation with a queue depth of 1, wherein the read operation comprises decoding the data, and wherein the decoding the data occurs for a time period that is less than the decoded time when the changing comprises increasing the number of PLCs.

10. The data storage device of claim 1, wherein an amount of time to decode data at a read operation after the data is programmed is decreased with an increase in the number of PLCs.

11. The data storage device of claim 1, wherein the controller is configured to calculate a number of PLCs to program the data, wherein an amount of time to program the data for the calculated number of PLCs is a first period of time, and wherein an amount of time to program data is decreased when the decoded time is below the threshold from the first period of time.

12. A data storage device, comprising:
a memory device; and
a controller coupled to the memory device, wherein the controller is configured to: calculate a decode time for data to be written to the memory device;
determine a number of program loop cycles (PLCs) to program the data to the memory device corresponding to the calculated decode time;
program the data to the memory device using the number of PLCs plus one additional PLC; and
decode the data during a read operation, wherein the decoding occurs for a first period of time, and wherein the first period of time is less than the calculated decode time for the programmed data using the number of PLCs plus one additional PLC.

13. The data storage device of claim 12, wherein the programming occurs to a triple level cell (TLC) of the memory device.

14. The data storage device of claim 12, wherein the read operation comprises sensing, transferring, and decoding performed sequentially.

15. The data storage device of claim 12, wherein the controller maintains a table that matches the decode time to the number of PLCs.

16. The data storage device of claim 15, wherein the number of PLCs for the decode time is different for a single level cell (SLC) and a triple level cell (TLC).

17. The data storage device of claim 15, wherein the controller is configured to search the table and retrieve the number of PLCs based upon the decode time.

18. A data storage device, comprising:
memory means; and
means to adjust a number of program loop cycles (PLCs) by one based upon a decoding time for data to be programmed to the memory means and a threshold decoding time, wherein a PLC comprises a program pulse and a verification operation; and
means to program the data to the memory means using the adjusted number of PLCs.

19. The data storage device of claim 18, further comprising means to compare the decoding time for data to be programmed to the threshold decoding time.

20. The data storage device of claim 18, further comprising means to decode the data.

* * * * *